(12) United States Patent
Vastardis

(10) Patent No.: US 11,350,144 B2
(45) Date of Patent: *May 31, 2022

(54) CONSOLIDATING CONTENT STREAMS TO CONSERVE BANDWIDTH

(71) Applicant: AT&T Intellectual Property I, L.P., Atlanta, GA (US)

(72) Inventor: Georgios Vastardis, Rowlett, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/182,143

(22) Filed: Feb. 22, 2021

(65) Prior Publication Data

US 2021/0185371 A1 Jun. 17, 2021

Related U.S. Application Data

(63) Continuation of application No. 16/216,655, filed on Dec. 11, 2018, now Pat. No. 10,931,984.

(51) Int. Cl.
*H04N 11/04* (2006.01)
*H04N 21/2365* (2011.01)
*H04N 21/24* (2011.01)
*H04N 21/236* (2011.01)
*H04N 21/2368* (2011.01)

(52) U.S. Cl.
CPC ... *H04N 21/23655* (2013.01); *H04N 21/2368* (2013.01); *H04N 21/23614* (2013.01); *H04N 21/2402* (2013.01)

(58) Field of Classification Search
CPC ......... H04N 21/4325; H04N 21/26241; H04N 21/23439; H04N 21/2407; H04N 21/23418
USPC ............................ 375/240; 725/93, 116, 118
See application file for complete search history.

(56) References Cited

U.S. PATENT DOCUMENTS

| | | |
|---|---|---|
| 6,973,081 B1 | 12/2005 | Patel |
| 7,079,495 B1 | 7/2006 | Pearce et al. |
| 7,688,861 B2 | 3/2010 | Sidana |
| 7,698,724 B1 | 4/2010 | Day |
| 8,701,145 B1 | 4/2014 | Berger et al. |
| 8,806,052 B1 | 8/2014 | Reister |
| 9,113,211 B1 | 8/2015 | Hanks |
| 9,788,302 B2 | 10/2017 | Baldwin |
| 2003/0063608 A1 | 4/2003 | Moonen |
| 2009/0106792 A1 | 4/2009 | Kan et al. |

(Continued)

FOREIGN PATENT DOCUMENTS

EP 2001252 A1 12/2008

*Primary Examiner* — Jivka A Rabovianski

(57) ABSTRACT

In one example, a method includes monitoring a delivery of an item of multimedia content to a first user endpoint device in a first stream of data, monitoring a delivery of the item of multimedia content to a second user endpoint device in a second stream of data, consolidating the stream of data and the second stream of data into a third stream of data, sending an first instruction to a source of the first stream of data and a source of the second stream of data to cease delivering the first stream of data and the second stream of data, and sending a second instruction to the source of the first stream of data and the source of the second stream to begin delivering the third stream of data to the first user endpoint device and the second user endpoint device.

20 Claims, 3 Drawing Sheets

(56) References Cited

U.S. PATENT DOCUMENTS

| | | | |
|---|---|---|---|
| 2009/0276821 A1* | 11/2009 | Amento | H04N 21/2407 725/116 |
| 2011/0164614 A1 | 7/2011 | Begeja | |
| 2015/0030022 A1 | 1/2015 | Mantin | |
| 2015/0087224 A1 | 3/2015 | Maharajh et al. | |
| 2016/0073176 A1* | 3/2016 | Phillips | H04L 47/15 725/35 |
| 2017/0070549 A1 | 3/2017 | Kotecha et al. | |

* cited by examiner

CONSOLIDATING CONTENT STREAMS TO CONSERVE BANDWIDTH

This application is a continuation of U.S. patent application Ser. No. 16/216,655, filed Dec. 11, 2018, now U.S. Pat. No. 10,931,984, which is herein incorporated by reference in its entirety.

The present disclosure relates generally to digital data distribution, and relates more particularly to methods, computer-readable media, and devices for consolidating multiple data streams that are streaming the same multimedia content to different devices.

BACKGROUND

Streaming media includes various types of multimedia content (e.g., television programs, video clips, music, podcasts, books, advertisements, and the like) that are delivered over a network as continuous streams of data (e.g., packets). For instance, a user endpoint device may establish a connection, via a telecommunications service provider network, to a server on which a file containing a video is stored. The file may be transmitted over the network to the user endpoint device as a stream of packets, where each packet contains a portion of the video. The user endpoint device may store these packets temporarily in a buffer so that the contents of the packets can be decoded and played back. As newer packets are received into the buffer, older packets containing content that has already been decoded and played back may be discarded.

SUMMARY

The present disclosure provides methods, computer-readable media, and devices for consolidating multiple data streams that are streaming the same multimedia content to different devices. In one example, a method includes monitoring a delivery of an item of multimedia content to a first user endpoint device in a first stream of data, monitoring a delivery of the item of multimedia content to a second user endpoint device in a second stream of data, consolidating the stream of data and the second stream of data into a third stream of data, sending an first instruction to a source of the first stream of data and a source of the second stream of data to cease delivering the first stream of data and the second stream of data, and sending a second instruction to the source of the first stream of data and the source of the second stream to begin delivering the third stream of data to the first user endpoint device and the second user endpoint device.

In another example, a device includes a processor and a non-transitory computer-readable medium storing instructions which, when executed by the processor, cause the processor to perform operations. The operations include monitoring a delivery of an item of multimedia content to a first user endpoint device in a first stream of data, monitoring a delivery of the item of multimedia content to a second user endpoint device in a second stream of data, consolidating the stream of data and the second stream of data into a third stream of data, sending an first instruction to a source of the first stream of data and a source of the second stream of data to cease delivering the first stream of data and the second stream of data, and sending a second instruction to the source of the first stream of data and the source of the second stream to begin delivering the third stream of data to the first user endpoint device and the second user endpoint device.

In another example, a computer-readable medium stores instructions which, when executed by a processor of a user endpoint device, cause the processor to perform operations. The operations include monitoring a delivery of an item of multimedia content to a first user endpoint device in a first stream of data, monitoring a delivery of the item of multimedia content to a second user endpoint device in a second stream of data, consolidating the stream of data and the second stream of data into a third stream of data, sending an first instruction to a source of the first stream of data and a source of the second stream of data to cease delivering the first stream of data and the second stream of data, and sending a second instruction to the source of the first stream of data and the source of the second stream to begin delivering the third stream of data to the first user endpoint device and the second user endpoint device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
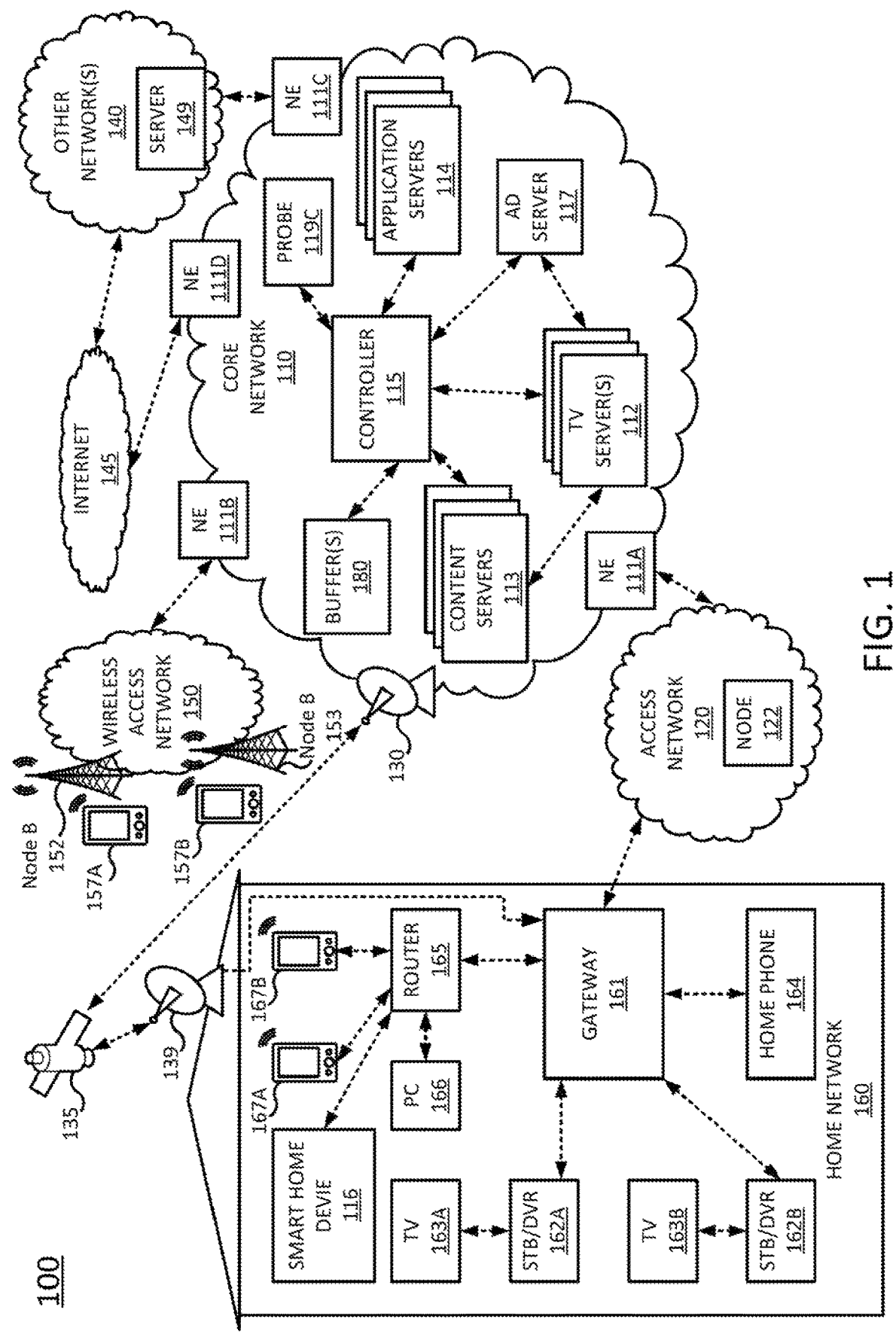
FIG. 1 illustrates an example network related to the present disclosure.

In one example, the present disclosure provides methods, computer-readable media, and devices for consolidating multiple data streams that are streaming the same multimedia content to different devices. As discussed above, streaming media involves delivering multimedia content over a network as a continuous stream of data (e.g., packets). As the number of services offering streaming media and the sophistication of the media itself continue to increase, so too does the amount of network bandwidth consumed by the streaming media. For instance, some recent studies have estimated that video streaming may account for almost half of all Internet traffic and more than a third of all hypertext transfer protocol (HTTP) traffic.

Examples of the present disclosure reduce the amount of bandwidth consumed by streaming media by consolidating or merging multiple data streams that are streaming the same multimedia content to different devices. In some examples, consolidation of the multiple streams may involve modifying the speed at which at least one of the streams is delivered.

For instance, a first user and a second user living on the same block as the first user may be streaming the same television show through a video on demand (VOD) service, but the first user may have started playing the television show back fifteen seconds before the second user started. Some VOD services might deliver the television show to a first user endpoint device of the first user as a first unicast stream and also deliver the television show to a second user endpoint device of the second user as a second unicast stream. This, in effect, doubles the amount of bandwidth consumed in delivering the television show to both the first and second users.

However, examples of the present disclosure may slow down the speed at which the television show is delivered to the first user endpoint device while also speeding up the speed at which the television show is delivered to the second user endpoint device, until the television show is synchronized on the first user endpoint device and second user endpoint device (e.g., the first user endpoint device and the second user endpoint device are playing the same frame(s) of the television show at the same time). At this point, the television show may be delivered as a single broadcast stream to both the first user endpoint device and the second user endpoint device, thereby reducing the amount of bandwidth consumed in delivering the television show to both devices.

Although examples of the present disclosure may be discussed within the illustrative context of viewable multimedia content (e.g., television programs, movies, advertisements, and the like), it will be appreciated that the examples described herein could also be applied to other types of streaming multimedia. For instance, examples of the present disclosure could be implemented to reduce the bandwidth consumed by streaming audio multimedia content (e.g., music, podcasts, audio books, and the like), printed multimedia content (e.g., books, magazines, newspapers, and the like), and other types of multimedia content.

To better understand the present disclosure, FIG. 1 illustrates an example network 100, related to the present disclosure. The network 100 may comprise part of a telecommunications service provider network. As shown in FIG. 1, the network 100 connects mobile devices 157A, 157B, 167A and 167B and home network devices such as home gateway 161, set-top boxes (STBs) 162A, and 162B, television (TV) 163A and TV 163B, home phone 164, router 165, personal computer (PC) 166, smart home or "Internet of Things" (IoT) device 116 (e.g., smart thermostat, smart lighting system, Internet radio intelligent personal assistant, etc.), and so forth, with one another and with various other devices via a core network 110, a wireless access network 150 (e.g., a cellular network), an access network 120, other networks 140 and/or the Internet 145. Mobile devices 157A, 157B, 167A and 167B, and home network devices such as home gateway 161, set-top boxes (STBs) 162A, and 162B, television (TV) 163A and TV 163B, home phone 164, router 165, personal computer (PC) 166, and smart home device 116, may also be referred to herein as "customer devices" or "user endpoint devices." As discussed in further detail below, the user endpoint devices may run applications through which multimedia content can be streamed. These applications may also communicate with a centralized controller to report data and receive instructions regarding the status of multimedia content being streamed on the user endpoint devices.

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, a portable gaming device, an email device, a computing tablet, a messaging device, a global positioning system (GPS), a satellite radio receiver or satellite television receiver, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, a controller 115, and a buffer or buffers 180. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may interact with content servers 113 and advertising server 117 to select which video programs, or other content and advertisements to provide to the home network 160 and to others.

In one example, content servers 113 may store scheduled television broadcast content for a number of television channels, video-on-demand programming, local programming content, and so forth. Content servers may also store non-video content, such as podcasts, audio books, electronic books, music, and the like. Content providers may upload various contents to the core network to be distributed to various subscribers. Alternatively, or in addition, content providers may stream various contents to the core network for distribution to various subscribers, e.g., for live content, such as news programming, sporting events, and the like.

In one example, advertising server 117 stores a number of advertisements that can be selected for presentation to viewers, e.g., in the home network 160, via the mobile devices 157A, 157B, 167A, and 167B, and at other downstream viewing locations. For example, advertisers may upload various advertising content to the core network 110 to be distributed to various viewers.

In one example, one or more of the application servers 114 may host a social media application, e.g., an Internet-based application via which users can create and share of information. For instance, the social media application may comprise a personal and/or professional social networking application, a blogging or microblogging application, an image or video sharing application, a web feed, or the like. The social media application may maintain a profile for each user of the social media application, which the user can update at any time. The social media application may also allow the user to consume content uploaded by other users and to comment on, rate, or review the content uploaded by the other users.

In one example, the television servers 112, content servers 113, application servers 114, and advertising server 117 may be geographically distributed in various locations. As discussed in further detail below, this may allow multimedia content to be dynamically and/or temporarily downloaded (e.g., under the direction of the controller 115) to servers whose location is relatively close to a location where there may be a greater demand for the multimedia content.

The buffer 180 may store portions (e.g., chunks or other segments) of items of multimedia content that are currently being streamed from any of the TV server(s) 112, content server(s) 113, application server(s) 114, and ad server 117. In this way, the buffer(s) 180 may act as a relay that facilitates consolidation of data streams when two more network users are streaming the same item of multimedia content.

In one example, the controller 115 comprises a server or computing device that has access to the content stored on the TV server(s) 112, content server(s) 113, application server(s) 114, and ad server 117. The controller 115 may access content from any of these sources and deliver the content to the user endpoint devices (e.g., mobile devices 157A, 157B, 167A and 167B, and home network devices such as home gateway 161, set-top boxes (STBs) 162A, and 162B, television (TV) 163A and TV 163B, home phone 164, router 165, personal computer (PC) 166, and smart home device 116) as streams of data (e.g., packets). In one example, the controller 115 may collect data from the user endpoint devices, and, based on the collected data, modify the manner in which one or more streams of data are delivered to the user endpoint devices. For instance, as discussed in further detail below, the controller 115 may modify the speed with a stream of data is delivered to allow for consolidation of the stream of data with at least one other stream of data.

Figure 3:
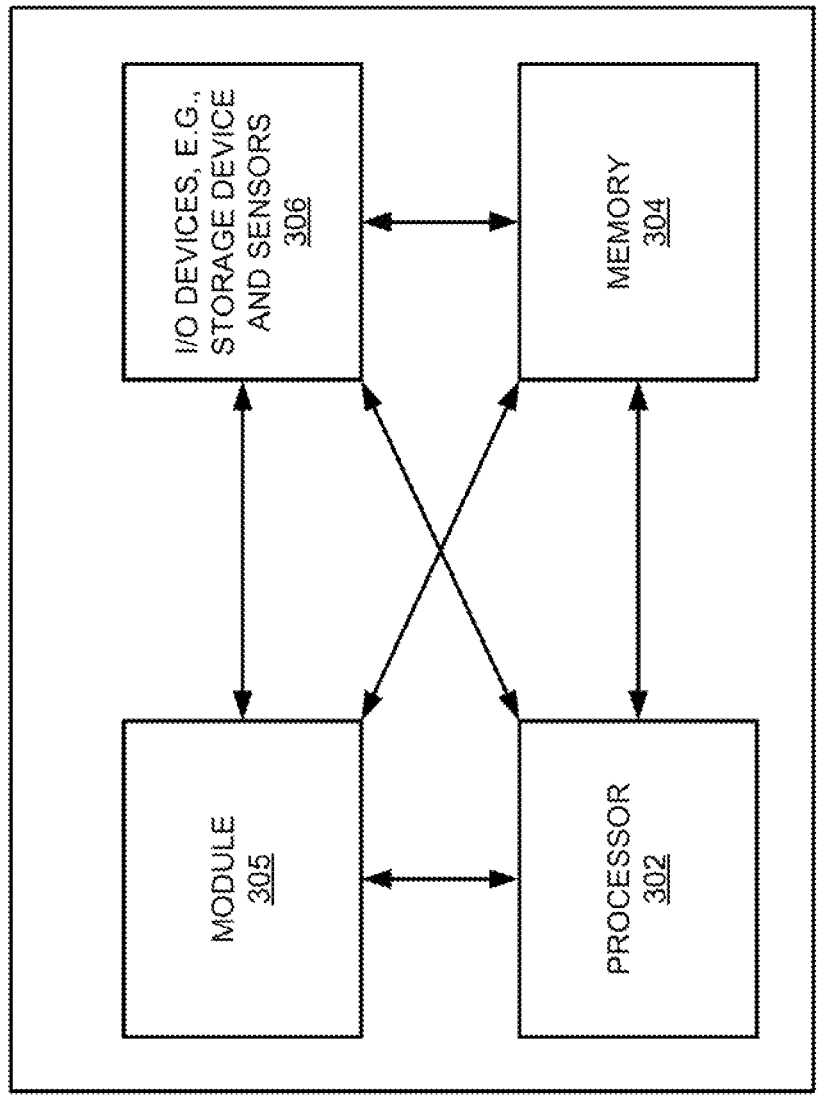
FIG. 3 depicts a high-level block diagram of a computing device specifically programmed to perform the functions described herein.

In one example, any or all of the television servers 112, content servers 113, application servers 114, controller 115, and advertising server 117 may comprise a computing system, such as computing system 300 depicted in FIG. 3.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data files are forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163A and 163B, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
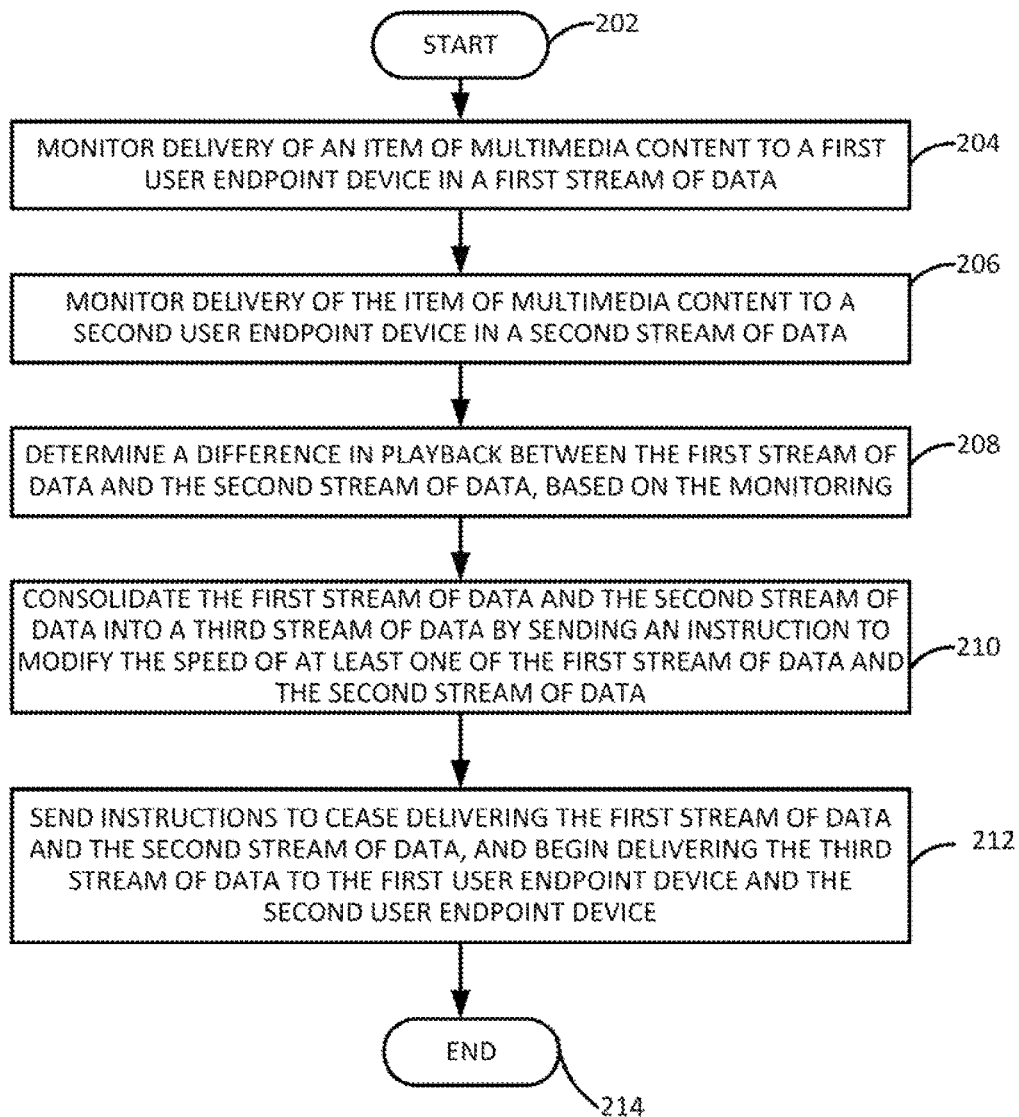
FIG. 2 illustrates a flowchart of an example method for consolidating multiple data streams that are streaming the same multimedia content to different devices.

To further aid in understanding the present disclosure, FIG. 2 illustrates a flowchart of an example method 200 for consolidating multiple data streams that are streaming the same multimedia content to different devices. In one example, the method 200 may be performed by a server such as the controller 115 illustrated in FIG. 1 and/or the computing device 300 illustrated in FIG. 3. However, in other examples, the method 200 may be performed by another device. For the sake of example, steps of the method 200 are described as being performed by a processor.

The method 200 begins in step 202. In step 204, the processor may monitor delivery of an item of multimedia content to a first user endpoint device in a first stream of data (e.g., as a unicast communication). The item of multimedia content may comprise, for example, video content (e.g., a television show or a movie) or audio content (e.g., music or a podcast). The item of multimedia content may be delivered by a server to the first user endpoint device, where the server may be operated by a content streaming service provider. As discussed above, the first stream of data may comprise a plurality of packets that are sent to the first user endpoint device in a continuous manner, where each packet of the plurality of packets contains a portion of the item of multimedia content.

In step 206, the processor may monitor delivery of the item of multimedia content (i.e., the same item of multimedia content being delivered in step 204) to a second user endpoint device in a second stream of data (e.g., as a unicast communication). The item of multimedia content may be delivered to the second user endpoint device by the same server that is delivering the item of multimedia content to the first user endpoint device, or buy a different server operated by the same content streaming service provider. As discussed above, the second stream of data may comprise a plurality of packets that are sent to the second user endpoint device in a continuous manner, where each packet of the plurality of packets contains a portion of the item of multimedia content.

In one example, prior to steps 204 and 206, the processor may be informed by the server(s) delivering the item of multimedia content that the item of multimedia content is being delivered. In one example, the server(s) may notify the processor directly. In another example, the processor may monitor a buffer (e.g., a relay buffer) to which servers upload items of multimedia content that are currently being streamed, as discussed in further detail below.

In steps 204 and 206, the monitoring may involve collecting data that identifies the respective progress each of the first user endpoint device and the second user endpoint device has made with respect to playback the item of multimedia content. For example, if the item of multimedia content comprises video or audio content, the first user endpoint device and the second user endpoint device may each send a frame identifier that indicates a particular frame of the item of multimedia content and a timestamp indicating a time at which first user endpoint device or the second user endpoint device played the particular frame. The data may further include information such as the remaining capacity in the respective buffers of the first user endpoint device and the second user endpoint device (e.g., number of bytes, percentage of overall capacity, etc.), which portions (e.g., packets or chunks) of the item of multimedia content are currently contained in the respective buffers of the first user endpoint device and the second user endpoint device, current respective locations of the first user endpoint device and the second user endpoint device if either device is mobile (e.g., global positioning system coordinates), confirmation that respective users of the first user endpoint device and the second user endpoint device are currently playing the item of multimedia content, and other data.

The data may be sent by the first user endpoint device and the second user endpoint device in response to a request issued by the processor. For instance, if the processor is aware that the same item of multimedia content is being delivered to the first user endpoint device and the second user endpoint device, the processor may identify this as a possible opportunity for consolidation of data streams. Alternatively, the first user endpoint device and the second user endpoint device may send this data periodically, randomly, or in response to the occurrence of a predefined event. For instance, if a user of the first user endpoint device detects a change in the quality of the item of multimedia content (e.g., a change in the image resolution of a video), the first user may trigger sending of the data to the processor in order to troubleshoot the change in quality. The change in the quality of the item of multimedia content may indicate a change in network conditions (e.g., a reduction in bandwidth, an increase in latency, etc.). The change in quality could also be automatically detected by the first user endpoint device.

In step 208, the processor may determine a difference in playback between the first stream of data and the second stream of data, based on the monitoring performed in steps 204 and 206. For instance, the processor may determine how much time or how many frames exist between the portion of the first stream of data that is currently being played and the portion of the second stream of data that is currently being played.

In step 210, the processor may consolidate the first stream of data and the second stream of data into a third (single) stream of data, by sending an instruction (e.g., to the server(s) delivering the first stream of data and/or the second stream of data) to modify the speed of at least one of the first stream of data and the second stream of data. In one example, modifying the speed of a stream of data may involve modifying the speed with which the stream of data is played. For instance, if the first stream of data is determined in step 210 to be fifteen seconds ahead of the second stream of data, then playback of the first stream of data may be temporarily slowed while playback of the second stream of data is temporarily sped up until the first stream of data and the second stream of data match (e.g., are playing the same frame at the same time). In one example, slow down or speed up of playback may adjust the playback speed by less than twenty percent of the current speed. In another example, slow down or speed up of playback may adjust the playback speed by between one and ten percent of the current speed to avoid noticeable alteration of the item of multimedia content. Moreover, in one example, the processor may only attempt to consolidate the first stream of data and the second stream of data if the difference between the streams does not exceed some threshold difference. The threshold difference may vary depending on the length of the item of multimedia content (e.g., the threshold difference may be eleven percent when the item of multimedia content is forty-five minutes long, but may be smaller when the item of multimedia content is shorter).

In another example, modifying the speed of a stream of data may involve inserting additional content, such as advertising content, episode recaps, news clips, or the like into the stream of data. For instance, if the first stream of data is determined in step 210 to be fifteen seconds ahead of the second stream of data, then a thirty-second commercial may be inserted into the first stream of data while a fifteen second commercial is inserted into the second set of data. The timing and durations of the commercial playbacks may be determined in each data stream so that by the time the respective commercials end, the first stream of data and the second stream of data match. Thus, streams of data may be consolidated by inserting commercials or other content of varying lengths. In one example, the commercials (or other content) may be inserted into predefined segments of the item of multimedia content (e.g., scene cuts, fades, etc.) or may be inserted when a user pauses playback.

Consolidating the first stream of data and the second stream of data may involve identifying the codec(s) used to compress the item of multimedia content in the first stream of data and the second stream of data. For instance, different video playback protocols may use different compression schemes. If necessary, the item of multimedia content may be recompressed according to a new codec to facilitate consolidation. As a result, the third stream of data may employ a new video playback protocol (i.e., a video playback protocol not employed by the first stream of data or the second stream of data). Depending on the source of the item of multimedia content (e.g., whether the controller has the ability to alter the actual content), the new video playback protocol may be implemented in the actual video playback or may be implemented as an envelope to the original video playback protocol (i.e., the protocol employed by the first and second streams of data).

In step 212, the processor may send instructions to cease delivering the first stream of data and the second stream of data and begin delivering the third stream of data to both the first user endpoint device and the second user endpoint device. Thus, bandwidth consumption may be reduced by delivering a single stream of data to the first user endpoint device and the second user endpoint device in place of separate streams of data. At this point, delivery of the item of multimedia content may become a broadcast communication (rather than two separate unicast communications).

The method 200 may end in step 214.

As discussed above, some examples of the present disclosure may insert strategically chosen advertising content in order to enable consolidation of streams of data. In some examples where it is desirable to conserve bandwidth, presentation of advertising content may be sacrificed (e.g., shorter commercials may be shown) in order to achieve a reduction in bandwidth consumption. In other examples where bandwidth conservation is not a priority, advertising content could be presented in a manner that maximizes revenue (e.g., longer or a greater number of commercials may be shown).

In one example, consolidation of the first stream of data and the second stream of data may be facilitated by the use of a relay buffer, such as the buffer(s) 180 of FIG. 1. In this case, the relay buffer may comprise downstream temporary storage that is not attached to or part of a specific user endpoint device. The controller may instruct each server that is streaming to a user endpoint device to upload content being streamed to the relay buffer within some threshold period of the streaming starting. The content held in the buffer could then be used to satisfy subsequent requests for the items of multimedia content that are already being streamed. Content held in the relay buffer may be deleted after a predefined period of time.

Furthermore, as discussed above, some examples of the disclosure may further conserve bandwidth by uploading items of multimedia content to servers in a strategic but temporary manner. For instance, if a relatively large number of users in the same location (e.g., within a threshold distance from each other) is expected to stream the same item of multimedia content at roughly the same time, the item of multimedia content could be uploaded to local servers in that location for a predefined period of time. This may then avoid the need for the users to stream the content over a potentially large distance. The item of multimedia content could be deleted from the local servers at or after a predefined time (e.g., x hours after upload) or upon a requests for the item of multimedia content falling below a predefined threshold (e.g., no more than y requests over x hours).

As an example, a large number of users on the West Coast of the United States may be expected to view the same episode of a television show currently being viewed by viewers on the East Coast, just three hours later. The television show could be dynamically uploaded to servers on the West Coast prior to the West Coast users requesting the show. As another example, cultural norms may drive the selection of content that is temporarily stored on local servers. For instance, more holiday-themed content could be stored during the month of December.

Moreover, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps, or blocks of the above described method(s) can be combined, separated, and/or performed in a different order from that described above, without departing from the examples of the present disclosure. For instance, some steps of the method 200 could be performed simultaneously. As an example, step 204 could be performed simultaneously with one or more of steps 206 and 208.

FIG. 3 depicts a high-level block diagram of a computing device specifically programmed to perform the functions described herein. For example, any one or more components or devices illustrated in FIG. 1 or described in connection with the method 200 may be implemented as the system 300.

For instance, a server or controller (such as the controller 115 of FIG. 1) could be implemented as illustrated in FIG. 3.

As depicted in FIG. 3, the system 300 comprises a hardware processor element 302, a memory 304, a module 305 for consolidating multiple data streams that are streaming the same multimedia content to different devices, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for consolidating multiple data streams that are streaming the same multimedia content to different devices may include circuitry and/or logic for performing special purpose functions relating to tracking and merging streams of data. The input/output devices 306 may include, for example, a camera, a video camera, storage devices (including but not limited to, a tape drive, a floppy drive, a hard disk drive or a compact disk drive), a receiver, a transmitter, a display, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for consolidating multiple data streams that are streaming the same multimedia content to different devices (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for consolidating multiple data streams that are streaming the same multimedia content to different devices (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
monitoring, by a controller in a telecommunications service provider network, a delivery of a first item of multimedia content to a first user endpoint device in a first stream of data;
monitoring, by the controller, a delivery of the first item of multimedia content to a second user endpoint device in a second stream of data, wherein the delivery of the first item of multimedia content to the first user endpoint device began at a different time than the delivery of the first item of multimedia content to the second user endpoint device;
consolidating, by the controller, the first stream of data and the second stream of data into a third stream of data containing the first item of multimedia content, wherein the consolidating is based on data sent by at least one of: the first user endpoint device or the second user endpoint device, in response to a detection of a change in a condition of the telecommunications service provider network;
sending, by the controller, a first instruction to a source of the first stream of data and a source of the second stream of data to cease delivering the first stream of data and the second stream of data; and
sending, by the controller, a second instruction to the source of the first stream of data or the source of the second stream of data to begin delivering the third stream of data to the first user endpoint device and the second user endpoint device.

2. The method of claim 1, wherein the source of the first stream of data and the source of the second stream of data are the same.

3. The method of claim 2, wherein the first stream of data is delivered as a first unicast communication, the second stream of data is delivered as a second unicast communication, and the third stream of data is delivered as a broadcast communication, wherein the consolidating comprises synchronizing the first unicast communication and the second unicast communication, so that the first user endpoint device and the second user endpoint device are playing a same frame of the first item of multimedia content at a same time, and wherein carrying out the first instruction and the second instruction by the first user endpoint device and the second user endpoint device results in the first unicast communication and the second unicast communication being replaced by the broadcast communication.

4. The method of claim 1, wherein the data comprises a point of playback of the first item of multimedia content on the first user endpoint device and a point of playback of the first item of multimedia content on the second user endpoint device, and the consolidating comprises:
   determining, by the controller, a difference between the point of playback of the first item of multimedia content on the first user endpoint device and the point of playback of the first item of multimedia content on the second user endpoint device; and
   modifying, by the controller, at least one of: the first stream of data or the second stream of data so that the point of playback of the first item of multimedia content on the first user endpoint device matches the point of playback of the first item of multimedia content on the second user endpoint device.

5. The method of claim 4, wherein the modifying comprises:
   changing, by the controller, a speed of playback of at least one of: the first stream of data or the second stream of data.

6. The method of claim 5, wherein the changing comprises:
   speeding up, by the controller, the speed of playback of the first stream of data on the first user endpoint device; and
   slowing down, by the controller, the speed of playback of the second stream of data on the second user device, until the point of playback of the first item of multimedia content on the first user endpoint device matches the point of playback of the first item of multimedia content on the second user endpoint device.

7. The method of claim 4, further comprising determining, prior to the modifying, that the difference exceeds a threshold difference, wherein the threshold difference varies depending upon a length of the first item of multimedia content.

8. The method of claim 4, wherein the modifying comprises:
   inserting, by the controller, additional content into at least one of: the first stream of data or the second stream of data.

9. The method of claim 4, wherein the data further comprises at least one of: a remaining capacity in a buffer of the first user endpoint device, a remaining capacity in a buffer of the second user endpoint device, which portions of the item of multimedia content are currently contained in the buffer of the first user endpoint device, which portions of the item of multimedia content are currently contained in the buffer of the second user endpoint device, a current location of the first user endpoint device, or a current location of the second user endpoint device.

10. The method of claim 8, wherein a timing and a duration of the additional content is chosen so that by a time playback of the additional content ends, the point of playback of the first item of multimedia content on the first user endpoint device matching the point of playback of the first item of multimedia content on the second user endpoint device.

11. The method of claim 8, wherein the additional content comprises advertising content.

12. The method of claim 8, wherein the inserting comprises:
   inserting, by the controller, a first item of advertising content of the additional content having a first duration into the first stream of data; and
   inserting, by the controller, a second item of advertising content of the additional content having a second duration into the second stream of data,
   wherein a difference between the first duration and the second duration is equal to a difference between the point of playback of the first item of multimedia content on the first user endpoint device matching the point of playback of the first item of multimedia content on the second user endpoint device.

13. The method of claim 1, wherein at least a part of the first item of multimedia content is stored by the source of the first media stream in a relay buffer, and wherein the relay buffer comprises a downstream temporary storage that is unattached to a specific user endpoint device.

14. The method of claim 13, wherein the monitoring comprises monitoring the relay buffer.

15. The method of claim 1, wherein the monitoring the delivery of the first item of multimedia content to the first user endpoint device includes identifying a time at which a specific frame of the first item of multimedia content was played back on the first user endpoint device, and wherein the monitoring the delivery of the first item of multimedia content to the second user endpoint device includes identifying a time at which the specific frame of the first item of multimedia content was played back on the second user endpoint device.

16. The method of claim 1, wherein the monitoring the delivery of the first item of multimedia content to the first user endpoint device includes identifying a first portion of the first item of multimedia content that is stored in a buffer of the first user endpoint device, and wherein the monitoring the delivery of the first item of multimedia content to the second user endpoint device includes identifying a second portion of the first item of multimedia content that is stored in a buffer of the second user endpoint device.

17. The method of claim 1, wherein the source of the first stream of data or the source of the second stream of data comprises a content server, an application server, or an advertisement server.

18. The method of claim 1, wherein the change in the condition of the telecommunications service provider network is detected by the at least one of: the first user endpoint device or the second user endpoint device.

19. A device comprising:
   a processor; and
   a non-transitory computer-readable medium storing instructions which, when executed by the processor, cause the processor to perform operations, the operations comprising:
      monitoring a delivery of a first item of multimedia content to a first user endpoint device in a first stream of data;
      monitoring a delivery of the first item of multimedia content to a second user endpoint device in a second stream of data, wherein the delivery of the first item of multimedia content to the first user endpoint device began at a different time than the delivery of the first item of multimedia content to the second user endpoint device;
      consolidating the first stream of data and the second stream of data into a third stream of data containing the first item of multimedia content, wherein the consolidating is based on data sent by at least one of: the first user endpoint device or the second user endpoint device, in response to a detection of a change in a condition of the telecommunications service provider network;

sending a first instruction to a source of the first stream of data and a source of the second stream of data to cease delivering the first stream of data and the second stream of data; and sending a second instruction to the source of the first stream of data or the source of the second stream of data to begin delivering the third stream of data to the first user endpoint device and the second user endpoint device.

20. A non-transitory computer-readable medium storing instructions which, when executed by a processor, cause the processor to perform operations, the operations comprising:

monitoring a delivery of a first item of multimedia content to a first user endpoint device in a first stream of data;

monitoring a delivery of the first item of multimedia content to a second user endpoint device in a second stream of data, wherein the delivery of the first item of multimedia content to the first user endpoint device began at a different time than the delivery of the first item of multimedia content to the second user endpoint device;

consolidating the first stream of data and the second stream of data into a third stream of data containing the first item of multimedia content, wherein the consolidating is based on data sent by at least one of: the first user endpoint device or the second user endpoint device, in response to a detection of a change in a condition of the telecommunications service provider network;

sending a first instruction to a source of the first stream of data and a source of the second stream of data to cease delivering the first stream of data and the second stream of data; and sending a second instruction to the source of the first stream of data or the source of the second stream of data to begin delivering the third stream of data to the first user endpoint device and the second user endpoint device.

\* \* \* \* \*